(12) United States Patent
Man et al.

(10) Patent No.: US 9,507,408 B2
(45) Date of Patent: Nov. 29, 2016

(54) POWER GATING FOR TERMINATION POWER SUPPLIES

(71) Applicant: Intel Corporation, Santa Clara, CA (US)

(72) Inventors: Xiuting C. Man, Portland, OR (US); Christopher P. Mozak, Beaverton, OR (US); Shaun M. Conrad, Cornelius, OR (US); Jeffery L. Krieger, Portland, OR (US); Philip R. Lehwalder, Hillsboro, OR (US); Inder M. Sodhi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 582 days.

(21) Appl. No.: 13/629,008

(22) Filed: Sep. 27, 2012

(65) Prior Publication Data

US 2014/0089705 A1    Mar. 27, 2014

(51) Int. Cl.
*G06F 1/00*    (2006.01)
*G06F 1/26*    (2006.01)
*G06F 1/32*    (2006.01)

(52) U.S. Cl.
CPC ........... *G06F 1/3296* (2013.01); *G06F 1/3275* (2013.01); *G06F 1/3287* (2013.01); *Y02B 60/1228* (2013.01); *Y02B 60/1282* (2013.01)

(58) Field of Classification Search
CPC ..................................................... G06F 1/3296
USPC ................................................. 713/323, 300
See application file for complete search history.

(56) References Cited

U.S. PATENT DOCUMENTS

| | | | |
|---|---|---|---|
| 2008/0001655 A1* | 1/2008 | Pham et al. | 327/544 |
| 2011/0047397 A1* | 2/2011 | Lee | G06F 1/3203 713/324 |
| 2011/0283117 A1* | 11/2011 | Krig | 713/300 |
| 2012/0033521 A1* | 2/2012 | Nakamura et al. | 365/226 |
| 2013/0003468 A1* | 1/2013 | Vergis | 365/189.09 |
| 2013/0016573 A1* | 1/2013 | Goel et al. | 365/189.06 |
| 2013/0099570 A1* | 4/2013 | Manohar et al. | 307/38 |
| 2013/0173902 A1* | 7/2013 | Sodhi | G06F 1/3243 713/100 |
| 2013/0332763 A1* | 12/2013 | Palaniappan | G11C 5/148 713/324 |

* cited by examiner

*Primary Examiner* — Robert Cassity
(74) *Attorney, Agent, or Firm* — Blakely, Sokoloff, Taylor & Zafman LLP

(57) ABSTRACT

Power gating control architectures. A memory device having at least a memory array and input/output (I/O) lines terminated on the memory device with termination circuitry coupled to receive a termination supply voltage ($V_{tt}$) with power gating circuitry to selectively gate the termination supply voltage in response to a power gating control signal (VttControl) is coupled with a processing core coupled with the memory device, the processing core to selectively assert and deassert the VttControl signal.

21 Claims, 3 Drawing Sheets

POWER GATING FOR TERMINATION POWER SUPPLIES

TECHNICAL FIELD

Embodiments of the invention relate to power management techniques. More specifically, embodiments of the invention relate to techniques for power gating of termination power supplies.

BACKGROUND

For mobile devices, platform and memory power consumption is proportionally higher than previous generations of devices due to aggressive low power requirements of the mobile devices. In deep sleep states memory device consumption may become increasingly important.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques for a processing core to generate an alert signal corresponding to the entry/exit of a deep sleep state, which can result in power gating of memory (e.g., DRAM) termination supply voltage supplies. The action reduces the overall platform and package power consumption.

For example, the memory command/control pins in DDRx (e.g., DDR-3, DDR-4, DDR-5) and low-power DDR (LPDDR) are terminated for signal integrity reasons on the mother board using physical resistors to a $V_{tt}$ rail, which has a nominal voltage of $V_{dd}/2$. In other embodiments, the $V_{tt}$ rail could have a different nominal voltage, for example, $V_{dd}$ or some other voltage level In low-power states, the memory (e.g., dynamic random access memory, DRAM) is placed in a self refresh mode and the CKE pin is driven low to maintain this state.

Figure 1:
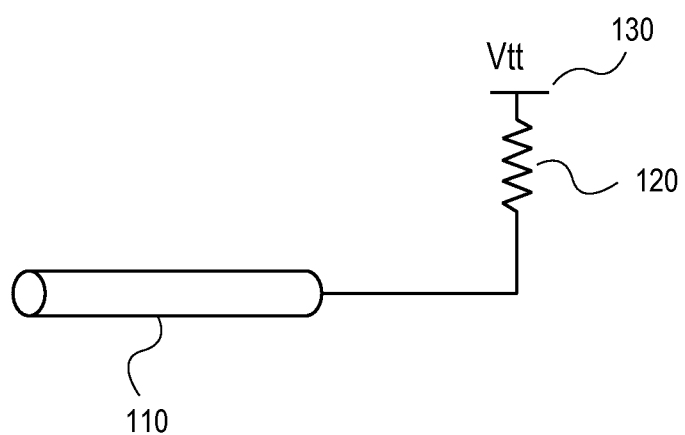
FIG. 1 is a circuit diagram of one embodiment of a termination scheme.

FIG. 1 is a circuit diagram of one embodiment of a termination scheme. The example of FIG. 1 illustrates only a single transmission line; however, any number of transmission lines can be utilized and coupled with the voltage supply.

In one embodiment, all of the elements of the voltage supply circuitry and the termination circuitry reside on the die to which transmission line 110 is coupled. In one embodiment, transmission line 110 is used for I/O signaling; however, other types of signals may also be transmitted over transmission line 110.

Voltage rail 130 provides a supply voltage for termination of transmission line 110. Resistor 120 is coupled between the end of transmission line 110 and voltage rail 130 to provide termination for transmission line 110. The resistance value of resistor 120 can be selected in any manner known in the art in order to provide the desired termination characteristics.

In one embodiment, the I/O signal that is driven on transmission line 110 will have a symmetrical voltage swing around the $V_{tt}$ voltage. In the case of I/O signals that are DC balanced (or close to DC balanced due to the use scrambling, for example), this results in equal amounts of current being sourced and sinked from the $V_{tt}$ rail on average, resulting in zero average current being drawn from the regulator. This symmetrical swing may reduce the power consumption of the $V_{tt}$ termination and associated $V_{tt}$ voltage regulator.

Figure 2:
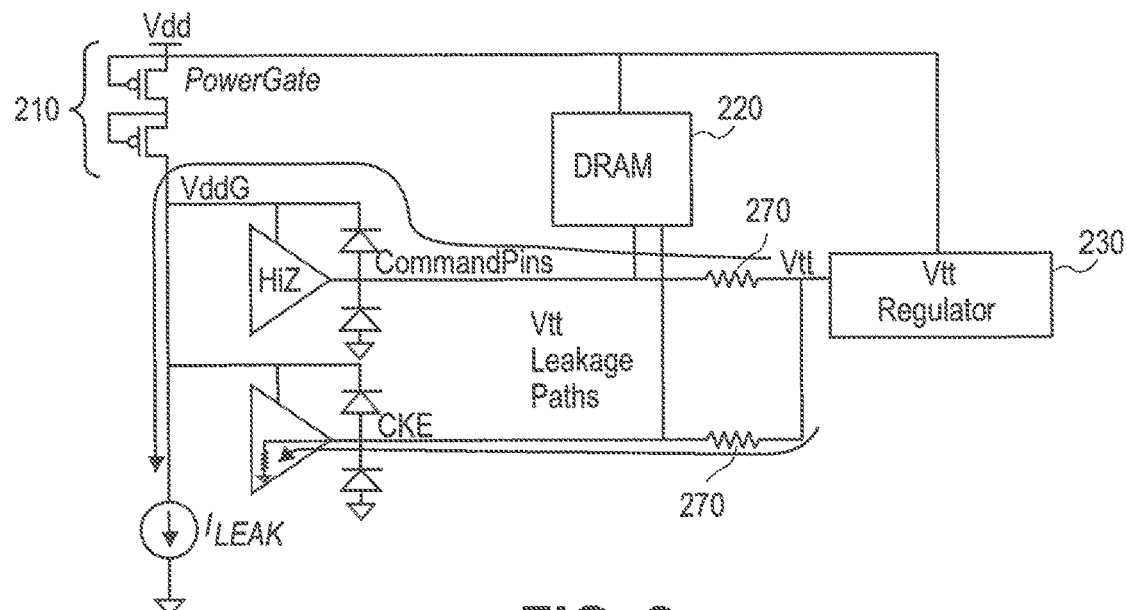
FIG. 2 is a circuit diagram that illustrates one embodiment of termination circuitry and corresponding leakage paths.

FIG. 2 is a circuit diagram that illustrates one embodiment of termination circuitry and corresponding leakage paths. If $V_{tt}$ remains on during a low power state, the CKE pins burn power even with relatively weak (e.g., 75Ω) termination. Leaving $V_{tt}$ on also degrades the effectiveness of the on-die $V_{ddG}$ power gate by forward biasing electrostatic discharge (ESD) diodes and charging the internal gated supply. Both paths are illustrated in FIG. 2. As a result, for lower power states, $V_{tt}$ is disabled. In one embodiment, this can be accomplished by having a processor core drive a VttControl signal (See FIG. 3) using ungated $V_{dd}$ to the $V_{tt}$ regulator.

Stacked transistors 210 operate as a power gate to provide the supply voltage ($V_{dd}$) to termination and other I/O circuitry. In one embodiment, the supply voltage is also provided memory (e.g., DRAM 220) and to a voltage regulator ($V_{tt}$ regulator 230) that provides a supply voltage for termination (resistors 270) purposes. In various embodiments, this voltage regulator may or may not be present and could use $V_{dd}$ or other voltages as an input to generate the $V_{tt}$ voltage shown here.

In one embodiment, two transistors are used for a stacked power gate; however, for higher voltages more than two transistors may be used to provide a stacked power gate. When the power gate is off (the supply voltage is not provided), a leakage path exists from $V_{tt}$ regulator 230 to ground through the command line termination.

In one embodiment, during deep power states the $V_{tt}$ power rail can be completely shut off under the control of a processing core or other control circuitry to achieve increased power savings. Shutting down $V_{tt}$ can be achieved through an enable to $V_{tt}$ regulator 230 or with an explicit power gate FET after the regulator. In one embodiment, in order to minimize exit latency, state and other information that is stored by circuits powered by the $V_{dd}$ rail are locally maintained using ungated $V_{dd}$ power (or other unrelated rails that remain alive) such that no save/restore is required and the chip can power up very quickly. In some embodiments, the latency of the power gate turning on can be small enough that it is completely hidden in the PLL lock time (or other on-die circuits).

Figure 3:
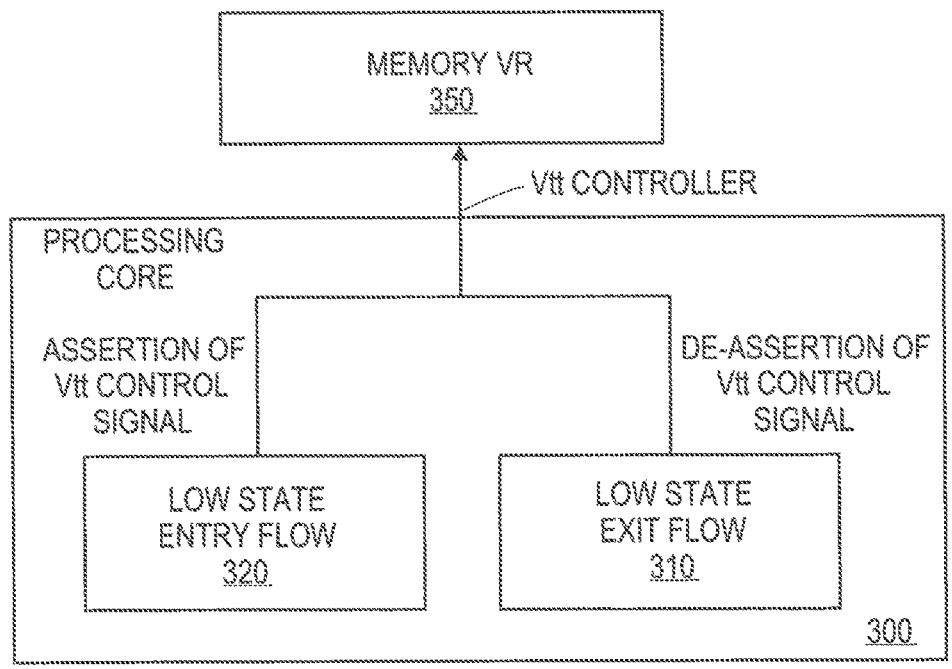
FIG. 3 is a block diagram of one embodiment of control circuitry for termination power supply gating.

FIG. 3 is a block diagram of one embodiment of control circuitry for termination power supply gating. In one embodiment, the control signal for power supply gating (VttControl) is asserted and deasserted in deeper sleep (lower power) states. In one embodiment, the host platform provides routing for the signal to one or more memory voltage $V_{tt}$ regulators. In one embodiment, the $V_{tt}$ level is configured to ramp up and down relatively quickly (e.g., 40 µs) to support fast transitions into and out of the lower power states.

In the example of FIG. 3, processing core 300 operates to control the operation of memory voltage regulator (VR) 350 in terms of at least controlling the gating of the $V_{tt}$ signal used for I/O termination purposes. Processing core 300 includes low state entry flow 320 and/or low state exit flow 310 which operate to control entry to and exit from low power states. In one embodiment, in these low power states the $V_{tt}$ supply is turned off with a power supply gating architecture, for example, as illustrated in FIG. 2. Power gating of all or part of a processing core can be separate from power gating of the memory device under control of the processing core, which can be accomplished through the voltage regulator or an explicit transistor power gate. Entry and exit flow can be, for example, one or more state machines, microcode, or other mechanism controlled by processing core 300.

In one embodiment, processing core 300 includes a mechanism (e.g., pin) to send the VttControl signal to memory VR 350. In response to the state of the VttControl signal, memory VR 350 operates to gate the $V_{tt}$ supply as illustrated above. Other gating mechanisms can also be used.

Figure 4:
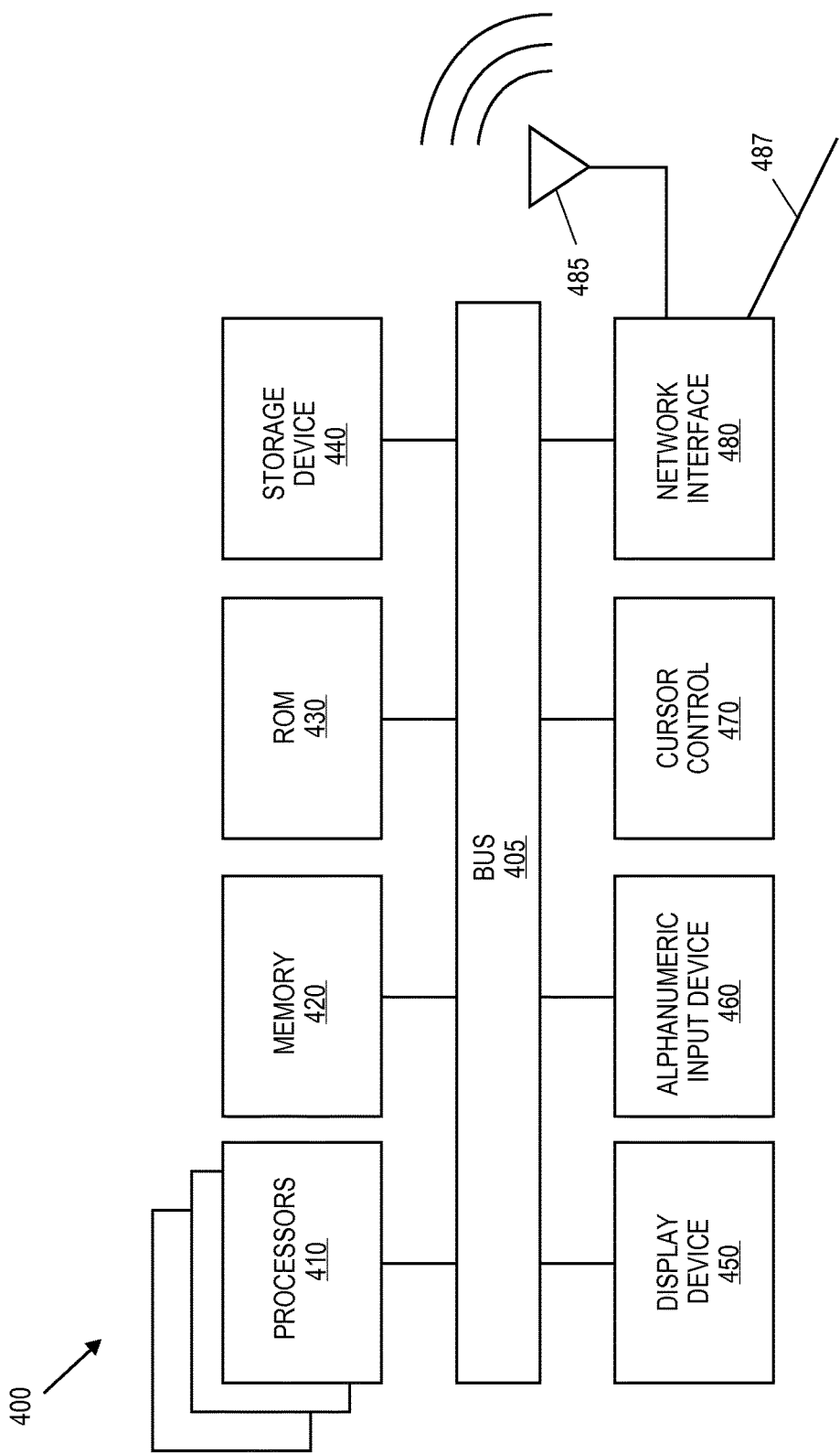
FIG. 4 is a block diagram of one embodiment of an electronic system.

FIG. 4 is a block diagram of one embodiment of an electronic system. The electronic system illustrated in FIG. 4 is intended to represent a range of electronic systems (either wired or wireless) including, for example, desktop computer systems, laptop computer systems, cellular telephones, personal digital assistants (PDAs) including cellular-enabled PDAs, set top boxes, tablets, etc. Alternative electronic systems may include more, fewer and/or different components.

Electronic system 400 includes bus 405 or other communication device to communicate information, and processor 410 coupled to bus 405 that may process information. While electronic system 400 is illustrated with a single processor, electronic system 400 may include multiple processors and/or co-processors. Electronic system 400 further may include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Electronic system 400 may also include read only memory (ROM) and/or other static storage device 430 coupled to bus 405 that may store static information and instructions for processor 410. Data storage device 440 may be coupled to bus 405 to store information and instructions. Data storage device 440 such as a magnetic disk or optical disc and corresponding drive may be coupled to electronic system 400.

Electronic system 400 may also be coupled via bus 405 to display device 450, such as a cathode ray tube (CRT) or liquid crystal display (LCD), to display information to a user. Alphanumeric input device 460, including alphanumeric and other keys, may be coupled to bus 405 to communicate information and command selections to processor 410. Another type of user input device is cursor control 470, such as a mouse, a trackball, or cursor direction keys to communicate direction information and command selections to processor 410 and to control cursor movement on display 450.

Electronic system 400 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

In one embodiment, network interface(s) 480 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In one embodiment, a power gating control architecture includes a memory device having at least a memory array and a plurality of input/output (I/O) lines. The I/O lines are terminated on the memory device with termination circuitry. The termination circuitry is coupled to receive a termination supply voltage ($V_{tt}$), the memory device also including power gating circuitry to selectively gate the termination supply voltage in response to a power gating control signal (VttControl). A processing core is coupled with the memory device. The processing core to selectively assert and deassert the VttControl signal.

In one embodiment, the power gating circuitry includes a transistor stack coupled between a voltage supply to provide a gated supply voltage wherein the supply voltage is greater than the maximum junction voltage of the individual transistors in the transistor stack. The power gating circuitry also includes termination circuitry for input/output (I/O) lines coupled to operate using the gated supply voltage, the termination circuitry comprising at least a resistive element coupled between an I/O interface and a termination voltage supply.

In one embodiment, the memory device is a dynamic random access memory (DRAM) device. In one embodiment, the processing core includes at least one state machine to control selectively asserting and deasserting the VttControl signal. In one embodiment, the DRAM device is a DDR-3 compliant memory device. In one embodiment, the DRAM device is a DDR-4 compliant memory device. In one embodiment, the DRAM device is a DDR-5 compliant memory device. In one embodiment, the DRAM device is a low-power DDR (LPDDR) compliant memory device.

In one embodiment, a tablet computing device includes a touchscreen input device and a memory device having at least a memory array and a plurality of input/output (I/O) lines. The I/O lines are terminated on the memory device with termination circuitry. The termination circuitry is coupled to receive a termination supply voltage ($V_{tt}$), the memory device also including power gating circuitry to selectively gate the termination supply voltage in response to a power gating control signal (VttControl). A processing core is coupled with the memory device. The processing core to selectively assert and deassert the VttControl signal.

In one embodiment, the power gating circuitry includes a transistor stack coupled between a voltage supply to provide a gated supply voltage wherein the supply voltage is greater than the maximum junction voltage of the individual transistors in the transistor stack. The power gating circuitry also includes termination circuitry for input/output (I/O) lines coupled to operate using the gated supply voltage, the termination circuitry comprising at least a resistive element coupled between an I/O interface and a termination voltage supply.

In one embodiment, the memory device is a dynamic random access memory (DRAM) device. In one embodiment, the processing core includes at least one state machine to control selectively asserting and deasserting the VttControl signal. In one embodiment, the DRAM device is a DDR-3 compliant memory device. In one embodiment, the DRAM device is a DDR-4 compliant memory device. In one embodiment, the DRAM device is a DDR-5 compliant memory device. In one embodiment, the DRAM device is a low-power DDR (LPDDR) compliant memory device.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus, comprising:
    a memory device comprising at least a memory array and a plurality of input/output (I/O) lines terminated on the memory device with termination circuitry, the termination circuitry coupled to receive a termination supply voltage;
    first power gating circuitry to selectively gate the termination supply voltage in response to a power gating control signal;
    second power gating circuitry to provide a gated supply voltage to buffer devices having respective outputs that are coupled to drive respective input lines of the I/O lines and that are terminated by the termination circuitry; and,
    a processing core coupled with the memory device, the processing core to selectively assert and deassert the power gating control signal so that the termination supply voltage is lowered if a supply voltage that supplies power to the buffer device is lowered, the lowering of the termination voltage to lessen leakage current through respective ESD diodes that are coupled between the respective outputs of the buffer devices and a supply node of the buffer devices that is to receive the supply voltage that would otherwise flow through the respective ESD diodes if the termination voltage was not lowered.

2. The apparatus of claim 1 wherein the first power gating circuitry is part of a voltage regulator that is to provide the termination voltage and that is coupled to receive the power gating control signal.

3. The apparatus of claim 1 wherein the memory device comprises a dynamic random access memory (DRAM) device.

4. The apparatus of claim 1 wherein the processing core further comprises at least one state machine to control the selective assertion and deassertion of the power gating control signal.

5. The apparatus of claim 1 wherein the memory device is a DRAM device that further comprises any of:
    a DDR-3 compliant memory device;
    a DDR-4 compliant memory device;
    a DDR-5 compliant memory device.

6. The apparatus of claim 1 wherein the first power gating circuitry comprises a power transistor that is coupled to receive the power gating control signal and that resides between a voltage regulator that is to provide the termination voltage.

7. The apparatus of claim 1 wherein the DRAM device comprises a low-power DDR (LPDDR) compliant memory device.

8. A tablet computing device comprising:
    a touchscreen input device;
    a memory device comprising at least a memory array and a plurality of input/output (I/O) lines terminated on the memory device with termination circuitry, the termination circuitry coupled to receive a termination supply voltage;
    first power gating circuitry to selectively gate the termination supply voltage in response to a power gating control signal;
    second power gating circuitry to provide a gated supply voltage to buffer devices having respective outputs that are coupled to drive respective input lines of the I/O lines and that are terminated by the termination circuitry and
    a processing core coupled with the memory device, the processing core to selectively assert and deassert the power gating control signal so that the termination supply voltage is lowered if a supply voltage that supplies power to the buffer device is lowered, the lowering of the termination voltage to lessen leakage current through respective ESD diodes that are coupled between the respective outputs of the buffer devices and a supply node of the buffer devices that is to receive the supply voltage that would otherwise flow through the respective ESD diodes into the supply node if the termination voltage was not lowered.

9. The tablet of claim 8 wherein the first power gating circuitry is part of a voltage regulator that is to provide the termination voltage and that is coupled to receive the power gating control signal.

10. The tablet of claim 8 wherein the memory device comprises a dynamic random access memory (DRAM) device.

11. The tablet of claim 8 wherein the processing core further comprises at least one state machine to control selectively asserting and deasserting the power gating control signal.

12. The tablet of claim 8 wherein the memory device is a DRAM device that further comprises any of:
   a DDR-3 compliant memory device;
   a DDR-4 compliant memory device;
   a DDR-5 compliant memory device.

13. The tablet of claim 11 wherein the first power gating circuitry comprises a power transistor that is coupled to receive the power gating control signal and that resides between a voltage regulator that is to provide the termination voltage.

14. The tablet of claim 8 wherein the memory device is a DRAM device that comprises a low-power DDR (LPDDR) compliant memory device.

15. A method, comprising:
   transitioning to a low power mode, the transitioning to a low power mode including lowering a supply voltage of buffer devices that drive input lines to a memory device, the input lines being terminated with a termination voltage, the transitioning to a low power mode also including lowering the termination voltage in response to a first state of a power gate control signal, the lowering of the termination voltage to lessen leakage current through respective ESD diodes that are coupled between respective outputs of the buffer devices and a supply node of the buffer devices that is to receive the supply voltage that would otherwise flow through the respective ESD diodes if the termination voltage was not lowered;
   transitioning from the low power mode to a high power mode, the transitioning to the high power mode including raising the supply voltage, the transitioning to the high power mode also including raising the termination voltage in response to a second state of the power gate control signal.

16. The method of claim 15 wherein the power gate control signal is provided to a voltage regulator that provides the termination voltage.

17. The method of claim 15 wherein the power gate control signal is provided to a transistor that is inserted between the output of a voltage regulator that provides the termination voltage and the input lines.

18. The method of claim 15 wherein a processor generates the power gate control signal.

19. A semiconductor chip, comprising:
   an interface to a memory device, the interface comprising a plurality of input/output (I/O) lines that are to be terminated on the memory device side with termination circuitry, the termination circuitry to receive a termination supply voltage;
   circuitry to generate a power gating control signal to selectively gate the termination supply voltage;
   buffer devices comprising respective outputs that are coupled to drive respective input lines of the I/O lines that are terminated by the termination circuitry;
   a supply node to provide a supply voltage to the buffer devices;
   respective ESD diodes coupled between the respective outputs of the buffer devices and the supply node;
   power gating circuitry to provide a gated supply voltage to the buffer devices; and,
   circuitry to selectively assert and deassert the power gating control signal so that the termination supply voltage is lowered if the supply voltage to the buffer devices is lowered, the lowering of the termination voltage to lessen leakage current through the respective ESD diodes that would otherwise flow through the respective ESD diodes if the termination voltage was not lowered.

20. The semiconductor chip of claim 19 wherein the interface to the memory device is a low-power DDR (LPDDR) compliant interface.

21. The semiconductor chip of claim 19 wherein the circuitry to selectively assert and deassert the power gating control signal comprises state machine circuitry.

* * * * *